US012754750B1

(12) United States Patent
Laishram et al.

(10) Patent No.: US 12,754,750 B1
(45) **Date of Patent: *Oct. 6, 2026**

(54) SYSTEM AND METHOD FOR ELEMENT DETECTION IN MOBILE DEVICES

(71) Applicant: Whatfix Private Limited, Bangalore (IN)

(72) Inventors: Arnold Laishram, Bangalore (IN); Aravind Girish, Bangalore (IN); Ashish Yadav, Bangalore (IN); Ajay Senthamarai, Bangalore (IN); Sahil Sachdeva, Bangalore (IN)

(73) Assignee: Whatfix Private Limited, Bangalore (IN)

( * ) Notice: Subject to any disclaimer, the term of this patent is extended or adjusted under 35 U.S.C. 154(b) by 4 days.

This patent is subject to a terminal disclaimer.

(21) Appl. No.: 18/357,582

(22) Filed: Jul. 24, 2023

(51) Int. Cl.

| | |
|---|---|
| ***G06F 9/451*** | (2018.01) |
| ***G06F 3/0482*** | (2013.01) |
| ***H04L 65/1069*** | (2022.01) |

(52) U.S. Cl.
CPC ............ *G06F 9/453* (2018.02); *G06F 3/0482* (2013.01); *H04L 65/1069* (2013.01)

(58) Field of Classification Search
CPC ..... G06F 9/453; G06F 3/0482; H04L 65/1069
See application file for complete search history.

(56) References Cited

U.S. PATENT DOCUMENTS

| | | | | |
|---|---|---|---|---|
| 11,669,353 | B1 * | 6/2023 | Sanghai | H04L 67/535 715/705 |
| 12,353,782 | B1 * | 7/2025 | Sachdeva | G06F 3/1454 |
| 2009/0158205 | A1 * | 6/2009 | Hampton | G06F 9/454 715/790 |
| 2015/0286486 | A1 * | 10/2015 | Smith, III | G06F 3/0484 715/705 |
| 2015/0301729 | A1 * | 10/2015 | Wang | G06F 3/0485 715/707 |
| 2018/0060093 | A1 * | 3/2018 | Irvine | G06F 8/20 |
| 2021/0405998 | A1 * | 12/2021 | Namburu | G06F 11/3495 |

* cited by examiner

*Primary Examiner* — Nicholas Ulrich
(74) *Attorney, Agent, or Firm* — Patent Law Works, LLP

(57) ABSTRACT

A technique for identifying mobile device screen elements and providing DAP content for mobile devices is disclosed. A DAP experience is stored as a config file. A mobile device accesses the config file to download information from the config file. An element detection phase may be performed to detect an element in a current context and identify content to be played.

19 Claims, 13 Drawing Sheets

SYSTEM AND METHOD FOR ELEMENT DETECTION IN MOBILE DEVICES

TECHNICAL FIELD

The present disclosure is related to element detection of a mobile device screen to a computer.

BACKGROUND

A digital adoption platform (DAP) is a type of software that is layered on top of another software, app, or website to help facilitate end user proficiency by helping to guide users through key tasks and provide contextual information as users navigate the user interface of the product. Users are provided with information to help familiarize them and become more proficient. This helps to drive adoption.

For example, a DAP may generate a help tip. Background information on an example DAP implementation is found in various sources, including U.S. Pat. Nos. 11,372,661 and 11,461,090 assigned to Whatfix Private Limited, the contents of which are hereby incorporated by reference. A DAP supports content authoring modules and content playback modules to generate, for example, smart tips as a user navigates elements of a user interface of an underlying software application.

A DAP supports content creators creating new flows or other guided features to enable higher adoption of client applications. Content Creators can create content, record a flow, and the content is played back with the same flow as and when required when end-user clients navigate the client application. This requires the DAP to find the visual UI elements on the application the user is looking at (e.g., finding where the user's cursor is located on a graphical user interface).

DAP solutions may be used with mobile applications (e.g., providing help for users of mobile computing devices to navigate mobile application running on smartphones, tablet devices, etc.). Content creators create content available to end users through their mobile devices. However, the small screen size of a mobile computing device, relative to a laptop or desktop computer, makes it cumbersome to create DAP content directly on the small screen size of a mobile computing device, such as a smartphone. One option is to provide a way for content authors to create content using a laptop or desktop computer, the author may create the DAP content on their laptop or notebook computer.

However, there are a variety of problems with using conventional approaches to performing element detection in mobile devices. Among other issues, rendering content on a mobile application has to be done using different processes compared with a web-based application running in a desktop screen. Element identification processes that work reliably and efficiently for a web-based application running in a mobile application typically don't work, or don't work adequately, if directly applied to a mobile application. Among other issues, there are a variety of different mobile application development platforms, such as Android®, Hybrid, and Web App in a mobile web view.

SUMMARY

A technique for identifying mobile device screen elements and providing a digital adoption platform (DAP) content for mobile devices is disclosed. A DAP experience is stored as a config file. A mobile device accesses the config file to download information from the config file. An element detection phase may be performed to detect an element in a current context and identify content to be played.

A first example method of element detection for a digital adoption platform (DAP) in mobile devices includes receiving DAP content created by a DAP content author for a mobile device application. Information for a DAP experience of the mobile device application is stored as a config file in a mobile server. In response to a request from a software development kit (SDK) running on a mobile device, access is provided to the config file to the SDK to identify mobile device screen elements and provide information for the DAP experience to be played as a user of the mobile device navigates an instantiation of the mobile application running on the mobile device.

In one implementation of the first example method, the config file includes at least one element, with each element including content assets and a list of identifiers including at least one of Native identifiers and Web Identifiers.

In one implementation, the Native identifiers include identifiers for a specific mobile device platform.

In one implementation, the list of identifiers comprises Native identifiers specific to an iOS® platform.

In one implementation, the list of identifiers include Native identifiers specific to an Android® platform.

In one implementation, the config file includes priority information to resolve conflicts between two different DAP contents playing on the same screen of a mobile application.

In one implementation, the config file includes page information for a non-start page.

In one implementation, the page information includes start page information and page numbers of non-start pages for a DAP flow experience having at least two elements.

A second example method for a DAP in mobile devices includes fetching, for a mobile device application, instantiation on a mobile device, a DAP config file from a mobile server, the DAP config file including a list of identifiers for at least one screen element and DAP assets for each screen element of the at least one screen element. Elements of the current context of the mobile device id detected, including identifying a list of screen elements for a current mobile application screen based on the list of identifiers in the DAP config file. DAP assets are accessed from the DAP config file for the current content. DAP content is displayed for a screen element of the current mobile application screen.

In one implementation of the second example method, the fetching is part of a configuration phase to fetch, process, and save DAP config data on the mobile device, including downloading DAP assets.

In one implementation, detecting elements of current context is part of a core element detection phase that includes matching web-based identifiers and native-identifiers, identifying pages, identifying assets and priority.

A third example method for a DAP in mobile devices includes, in response to a request from a software development kit (SDK) running on a mobile device, downloading a copy of a config file from a mobile server, the config file providing a list of screen elements, associated element identifiers, and associated content assets to provide information for a DAP experience to be played as a user of the mobile device navigates an instantiation of the mobile application running on the mobile device. The SDK detects a context present in a current mobile device screen of the mobile device, wherein the context is a representation of the list of identifiers from the config file present in the current mobile screen. DAP content is played for an identified screen element in the current mobile device screen.

In one implementation, the config file includes a list of identifiers including at least one of Native identifiers and Web Identifiers, with each element in the config file having at least one identifier and DAP content assets.

In one implementation, the Native identifiers include identifiers to identify DAP content assets specific to a specific mobile device platform.

The computer-implemented method of claim 14, wherein the native identifiers include identifiers to identify DAP content assets specific to iOS® platforms.

In one implementation, the Native identifiers include identifiers to identify DAP content assets specific to Android® platforms.

In one implementation, the config file includes priority information to resolve conflicts between two DAP contents playing on the same screen of a mobile application.

In one implementation, the config file includes page information.

In one implementation, the page information includes start page information and page numbers of non-start pages for a DAP flow experience having at least two elements.

In one implementation, the SDK downloads a copy of the config file, detects the current active window of the mobile application, and extracts identifiers and content.

DETAILED DESCRIPTION

Figure 1:
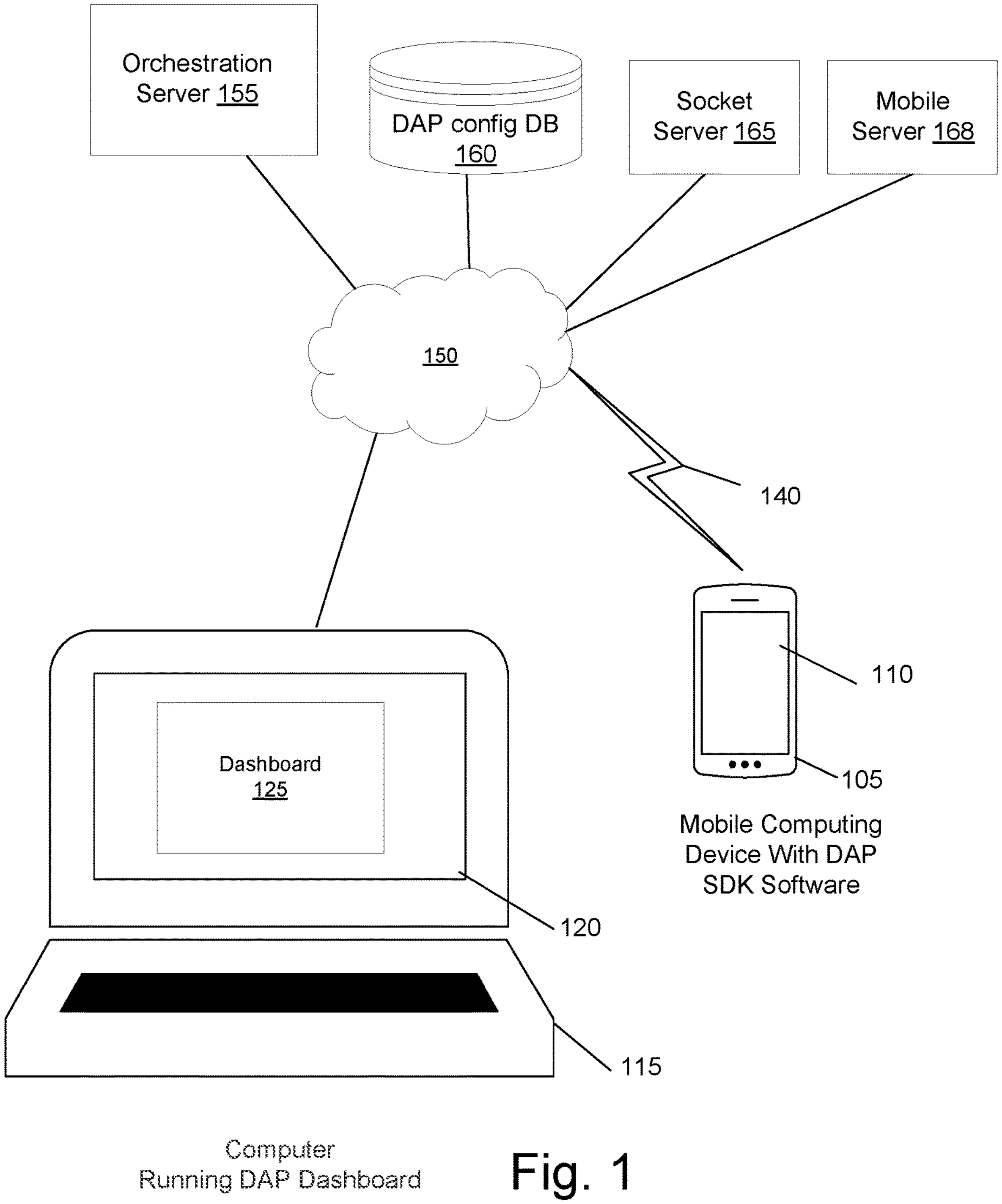
FIG. 1 illustrates a system for creating mobile device DAP content and storing a config file for a DAP experience in a manner accessible to a mobile device via a mobile server in accordance with an implementation.

Referring to FIG. 1, in one implementation, a mobile computing device 105 has a mobile device screen 110. Mobile computing device 105 may, for example, be a smartphone, but more generally it could be other types of small screen mobile computing devices, such as mobile tablet devices. Computer 115 may, for example, be a desktop computer or laptop computer (although for ease of description, the terms "desktop computer" and "desktop" are used broadly). Computer 115 has a display screen 120 onto which a web dashboard may be displayed to aid in generating DAP content.

The mobile computing device 105 may, for example, have a global internet connection (e.g., via a wireless link 140). The mobile computing device 105 may operate a software development kit (SDK) to support DAP.

In one implementation, an orchestration server 155 and a socket server 165 are provided. Support for implementing DAP content creation/editing is provided. A DAP configuration database 160 stores a DAP config for DAP content, where, for example, the DAP config may, for example, be stored in a file format. The orchestration server 155, socket server 165, and DAP configuration database 160 may be accessed in some implementations via a network connection 150 (e.g., via the Internet, through cloud-based services, etc.).

In one implementation, the orchestration server 155 is a server through which data is written to and read from the DAP config database. In one implementation, the orchestration server 155 is responsible for generating a unique connection identifier (ID), for establishing a secure session between the dashboard on computer 115 and the SDK of the mobile computing device 105. In one implementation, the orchestration server is a central server through which data is written to/read from the DAP config database 160. In one implementation, it is also responsible for creating a unique connection id (room id) for establishing a connection between Dashboard and SDK.

In one implementation, the socket server 165 is provided for the dashboard and the SDK to establish a socket connection to the socket server. The socket server 165 acts as an intermediary for their communication.

In one implementation, the DAP config DB stores information on DAP config files to identify mobile device screen elements and provide DAP content. In one implementation, a mobile server 168 provides the SDK access to an appropriate config file in the DAP config database 160. As an implementation detail, the mobile server 168 may be implemented using the same server as socket server 165, although more generally it may be a separate server different than the socket server 165.

The DAP dashboard is used by a content author to create DAP content for their mobile applications. In one implementation, the dashboard is implemented as a Web application for a content author to create DAP content for their mobile applications by accessing the DAP dashboard.

As illustrated in FIG. 1, the computer 115 may run a DAP dashboard 125 displayed on screen 120 through, for example, a web application.

The mobile computing device 105 may, for example, include a user interface, processors, memory to store computer code, a cache memory to store a downloaded copy of a DAP config, and a wireless communication capability. The mobile computing device 105 may have a mobile device app installed on it, which in turn has the SDK executing on it. In one implementation, the SDK integrates DAP into a mobile application. The SDK may be provided to mobile application developers to integrate DAP functionality into their mobile application. That is, application developers insert a few lines of code in their application code to integrate the SDK into their application code.

Additional background information on content creation for creating DAP content for mobile devices is found in two patent applications of the assignee of the present application, including "SYSTEM AND METHOD FOR QR CODE BASED MIRRORING OF MOBILE SCREEN TO COMPUTER", U.S. patent application Ser. No. 18/170,382 and "SYSTEM AND METHOD FOR USING INSPECT ELEMENT FRAMEWORK FOR BUILDING MOBILE DAP CONTENT", U.S. patent application Ser. No. 18/174,760, the contents of each of which are hereby incorporated by reference.

Figure 2:
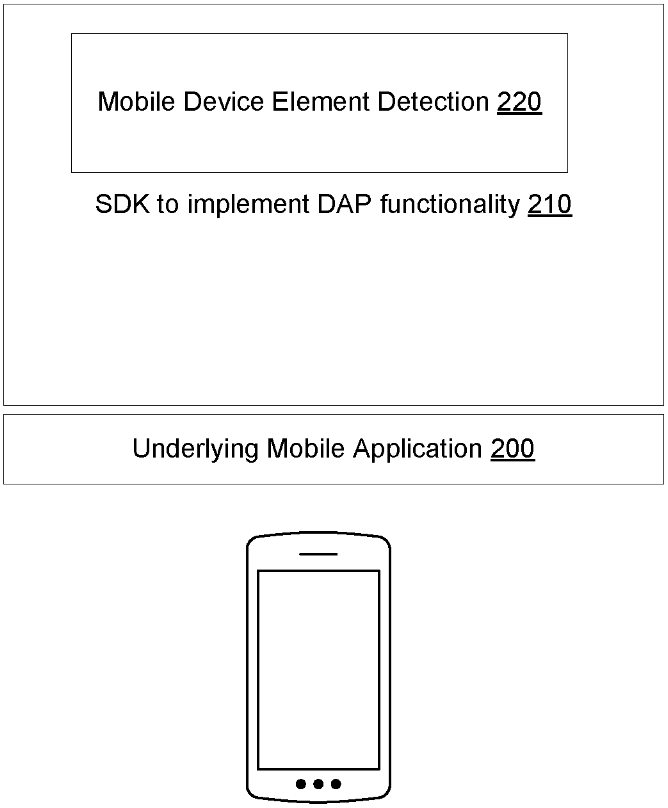
FIG. 2 is a high-level example of an SDK supporting mobile device element detection in accordance with an implementation.

FIG. 2 is a high-level block diagram showing an underlying mobile application 200 for a mobile computing device, and the SDK kit 210 to implement the overall DAP functionality on the underlying mobile application. The SDK 210 may, for example, include one or more software modules to support DAP element detection 220 and displaying the proper DAP content as a user navigates the mobile application.

Figure 3A:
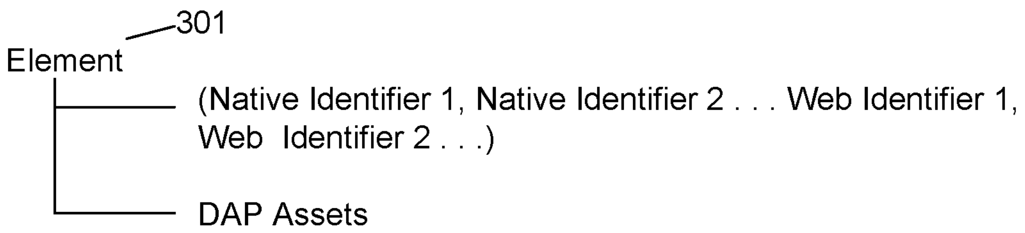
FIG. 3A is a high-level illustration of a portion of a DAP config file having an element with element identifiers and DAP content assets in accordance with an implementation.
Figure 3B:
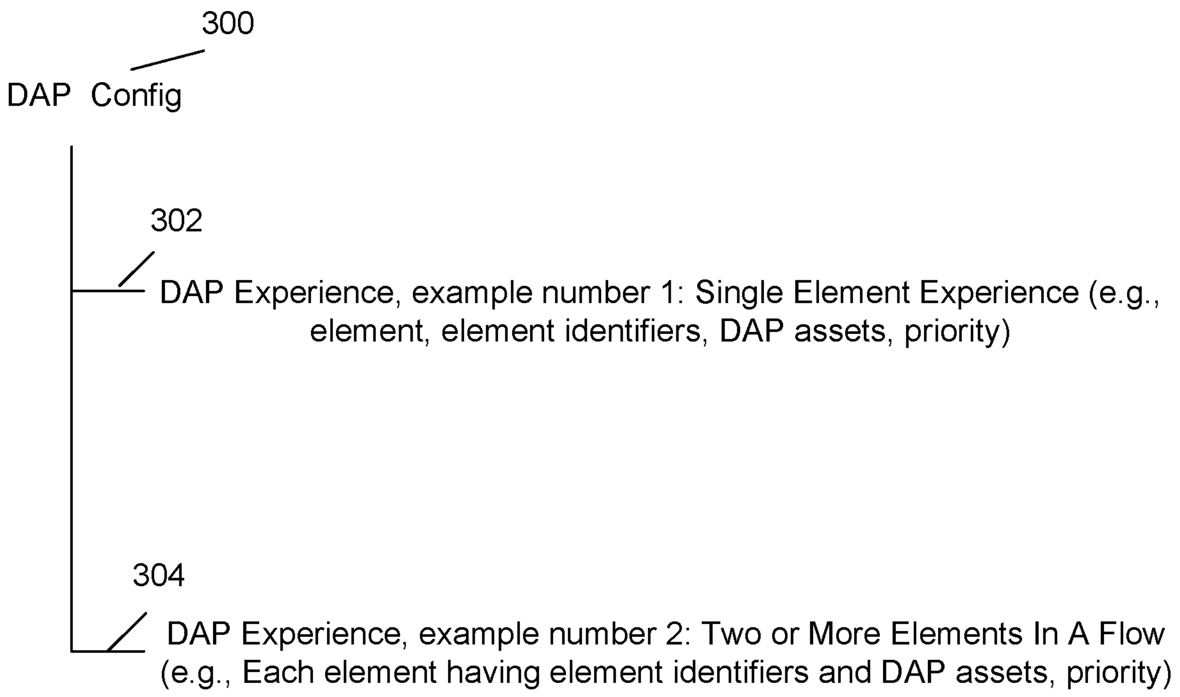
FIG. 3B illustrates how the DAP config file may include a single element experience and/or two or more elements in a flow in accordance with an implementation.
Figure 3C:
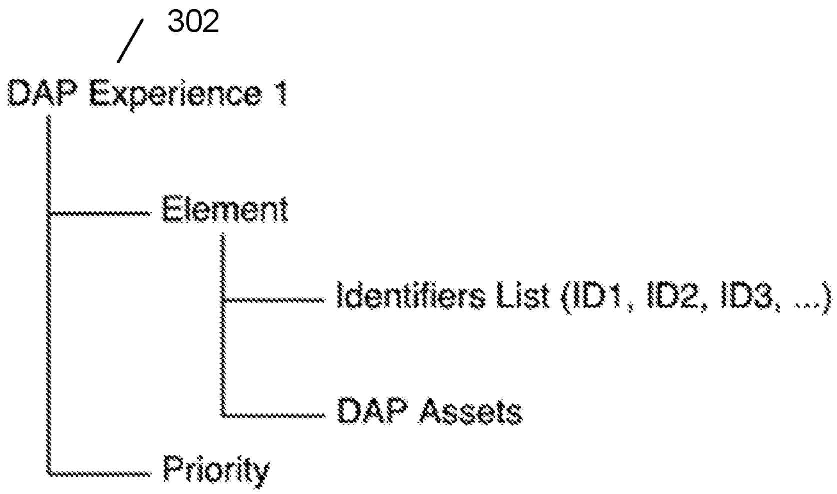
FIG. 3C illustrates a single element DAP experience in accordance with an implementation.
Figure 3D:
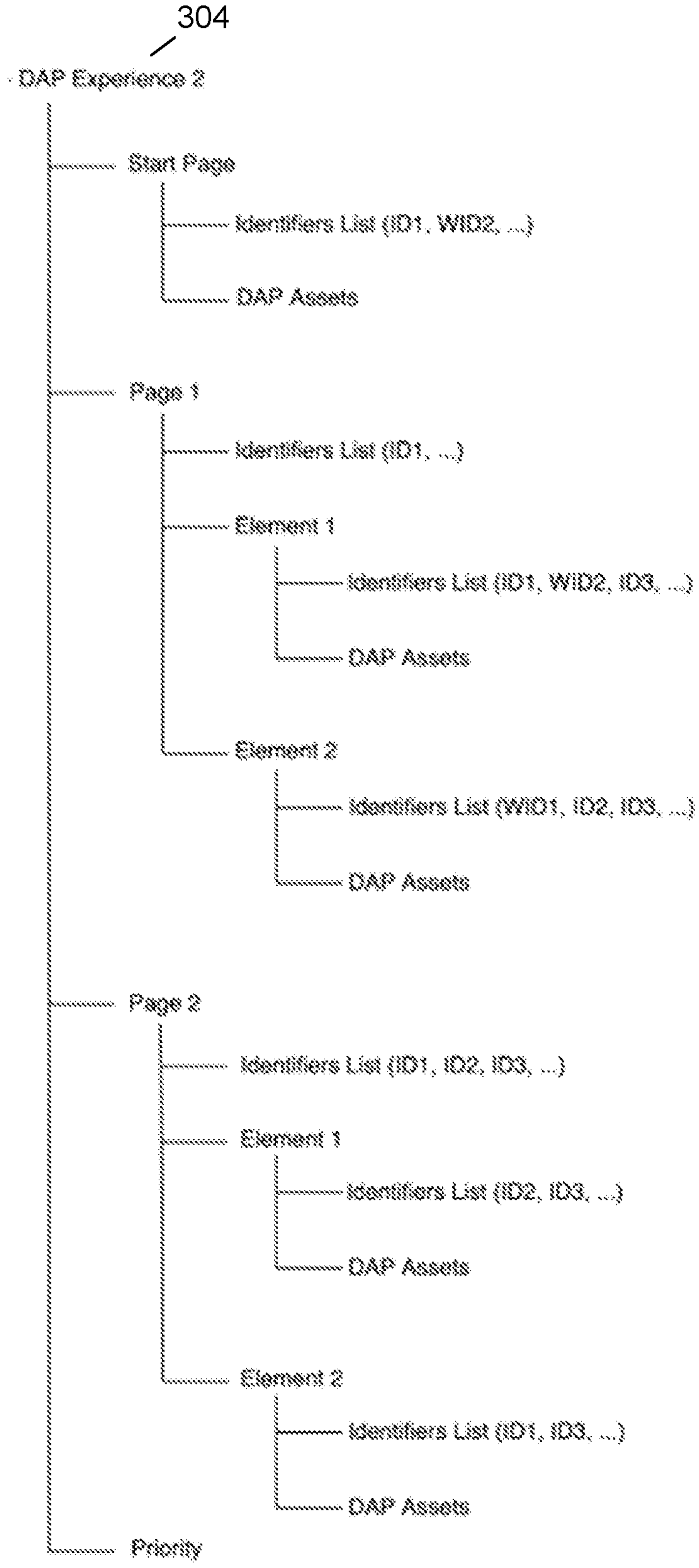
FIG. 3D illustrates two or more DAP elements in a flow in accordance with an implementation.

In one implementation, the DAP experience can be broadly classified into two basic types of DAP experience. These include a single element DAP experience and a Flow DAP experience. FIG. 3A illustrates an example of an element 301 in a DAP config file having a list of Native identifiers and Web identifiers, along with DAP content assets. FIG. 3B illustrates a DAP config for a single element DAP experience 302 and a flow DAP experience 304. FIG. 3C illustrates in more detail the DAP config for a single element DAP experience. FIG. 3D illustrates in more detail the DAP config for a DAP flow experience.

In one implementation, the DAP config is a JavaScript Object Notation (JSON) file format which contains the DAP content to be played and information to determine which mobile device screen of a mobile application to display the DAP content. In one implementation, the DAP config also contains priority rules that the SDK uses to resolve conflicts between two DAP contents playing on the same screen of a mobile application.

In one implementation, single element DAP experiences 302 are supported as well as DAP experiences 304 corresponding to a flow of two or more elements. A single element DAP experience 302 is independent in nature and contains only one DAP element (e.g., a banner, tooltip etc.) that has to be shown on the mobile application. However, a flow DAP experience 304 supports more complicated user experiences. Mobile applications can have a lot of pages such as a home page, payment page, profile page, etc. Consequently, a flow DAP experience 304 may contain a list of these pages along with other information. The pages in a flow DAP experience include several different types, including a start page and non-start page. A start page signifies the starting page of a flow DAP experience and it contains only one element to be shown on the mobile application. A non-start page includes all other pages other than the start page. These pages usually contain one or more elements to be shown on the mobile application. As an example, in the profile of an application, there are multiple input fields where DAP content typically needs to be displayed.

A DAP element, which may be referred to as an element, contains a list of one or more identifiers. These identifiers need to be detected, that is matched, as part of the mobile device element identification process. A DAP element also includes DAP assets that are to be displayed on the mobile application upon identification of a particular screen element in the current mobile device screen of a mobile application.

Some examples of DAP identifiers include a Native Identifier and a Web Identifier. A Native Identifier contains all of the relevant attributes for identification of a Native-element (e.g., Android® or iOS®). As an example of a Native Identifier consider the following example: Id=btn_submit, Class-Button. A Web identifier contains all the relevant attributes for identifying a web DOM-element. As an example of Web Identifier consider the example: Id=profile_pic, alt=pic, tag=img. This approach takes into account differences between different mobile device platform operating system implementations, such as differences between Android® and iOS® mobile device platform operating system implementations. This approach is also expandable to include other types of mobile device platform operating system implementations that may develop in the future.

Consider an Android® mobile device platform implementation. For Android®, an Activity represents a single screen of a user interface. It is the fundamental building block of an Android® app and serves as a container for an Android® mobile device user interface. In Android®, a Dialog is a type of window that is used to display important or urgent information to the user. It typically appears as a modal window and blocks input to the underlying activity until the user dismisses the dialog. For example, Dialogs can be used to prompt the user for input, display an error message, or present a confirmation. In Android®, a Popup Window is a type of window that is used to display content in a floating window above the current activity. It is similar to a Dialog, but it does not take focus and does not interrupt the user's interaction with the activity. In Android®, a Toast is a small, transient message that provides the user with simple feedback about an operation.

Consider now some examples of an iOS® platform implementation. In iOS®, a ViewController represents a single screen with a user interface. It is the fundamental building block of an iOS® app and serves as a container for the app's user interface.

In one implementation, Context refers to the current state of the mobile application visible to the user on a mobile device screen of a mobile application. In one implementation, the context is a single representation of a list of identifiers (from the DAP config) present in the current mobile screen. For example, a "Login" button in a mobile screen "Login Page" is a context.

Figure 4:
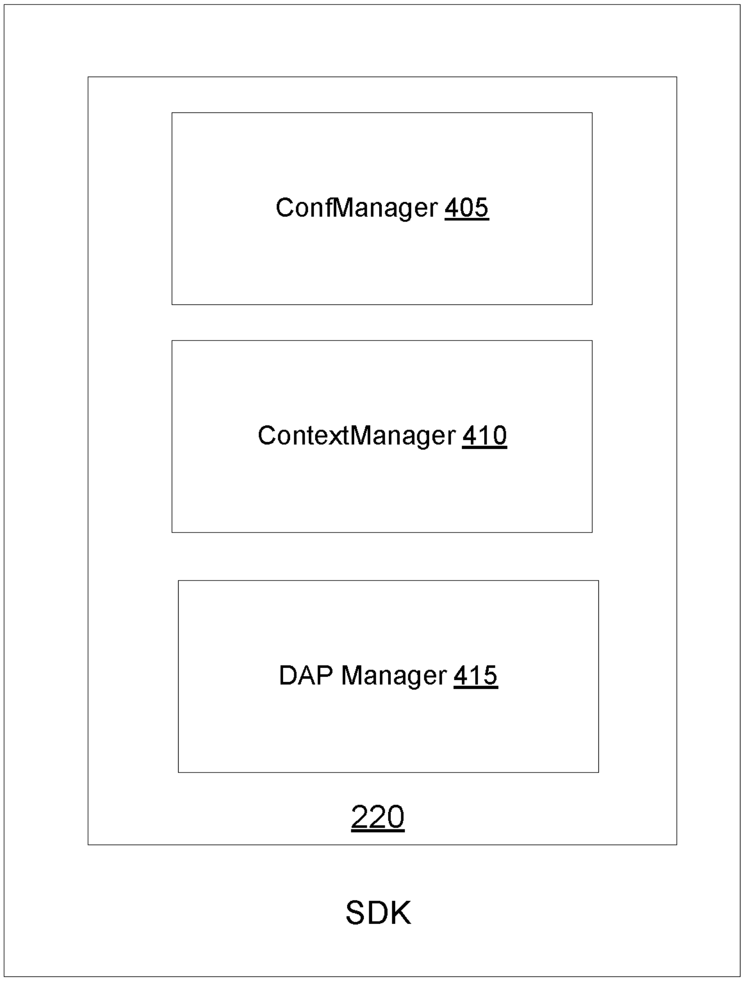
FIG. 4 illustrates an example of modules within a mobile device element detection unit in accordance with an implementation.

Referring to FIG. 4, in one implementation, the SDK includes several managers that include a ConfManager 405 that is responsible to fetch the DAP config from the network, process it and save it in cache. After the successful processing of the DAP config, it passes the DAP config to a ContextManager 410. The ContextManager takes the DAP config from ConfigManager and starts a process of Context Detection. It is responsible to detect the valid context and give that information to DAPManager 415. The DAPManager takes the context and provides the appropriate DAP content for an element of the current screen.

Figure 5:
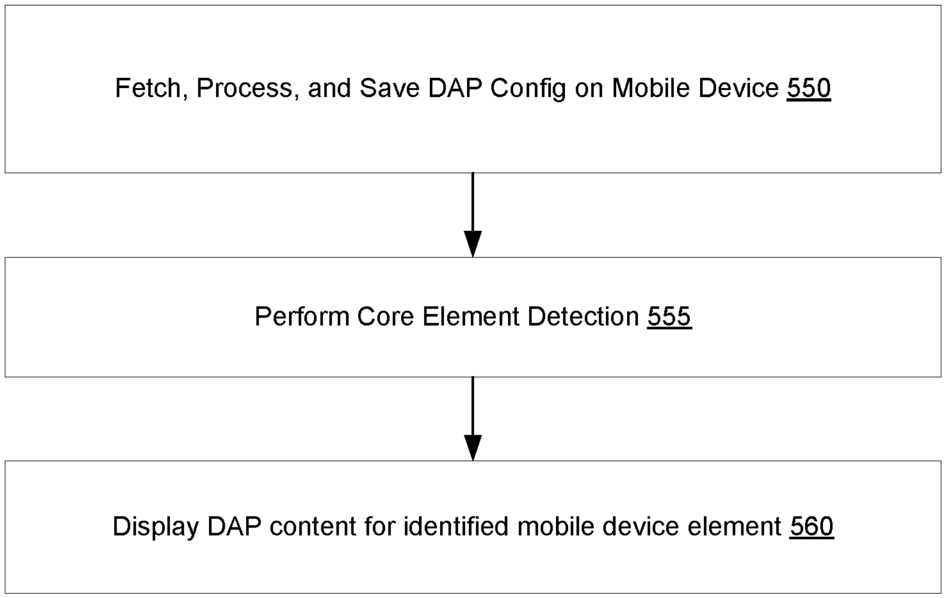
FIG. 5 is a flow chart of a high-level method of fetching a DAP config, identifying a device screen element, and extracting information to display DAP content for the identified device screen element in accordance with an implementation.
Figure 6:
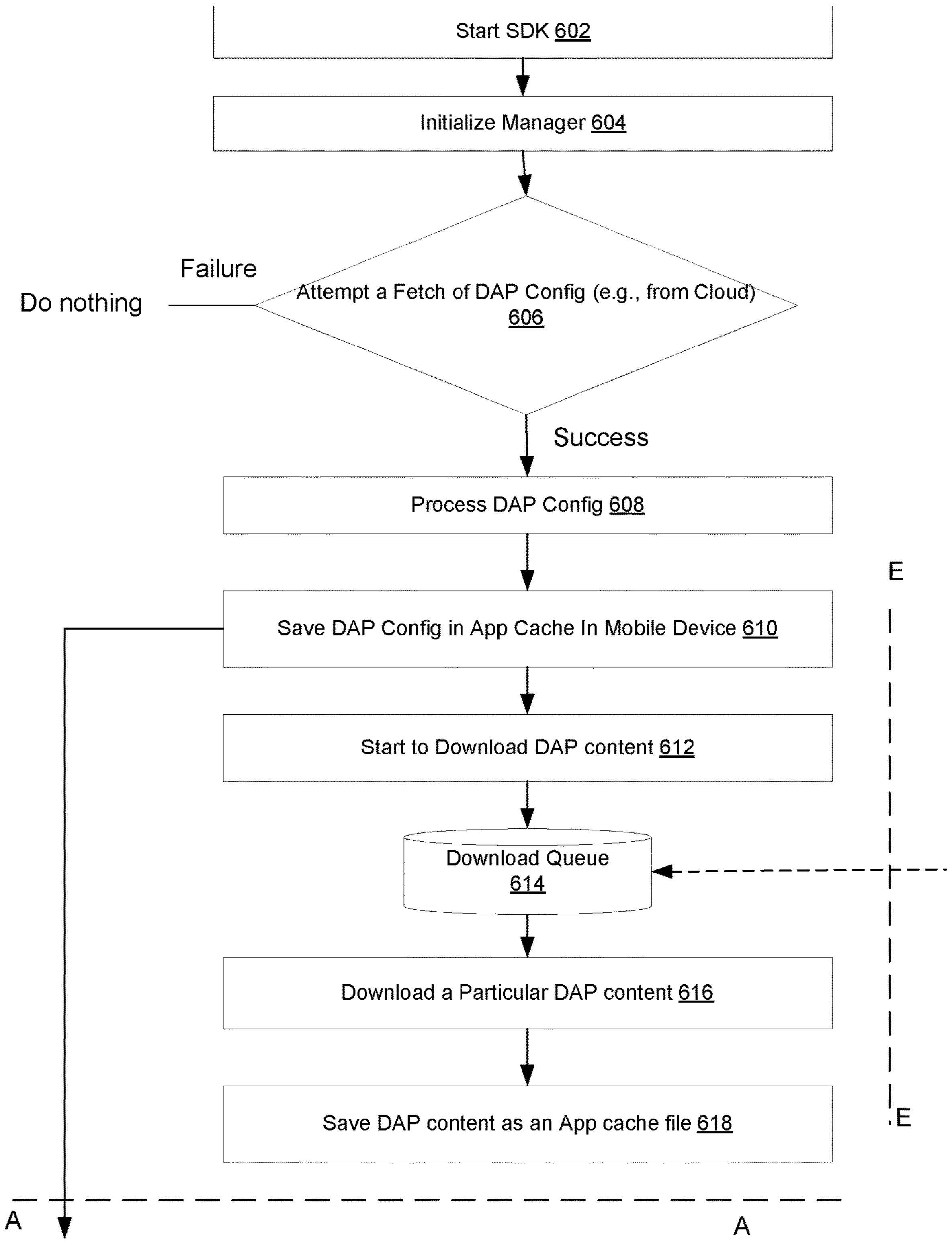
FIG. 6 is a flowchart of a method of downloading and saving selected DAP content on a mobile device for mobile element detection and implementation of a DAP experience in accordance with an implementation.

Referring to FIG. 5, at a high level, an SDK lifecycle for displaying mobile application DAP content includes three phases as illustrated in FIG. 5. A configuration phase 550 performs various tasks to fetch, process, and save DAP config data on the mobile device, including downloading DAP assets/contents to a cache of the mobile device. Second, a core element detection phase 555 performs various tasks associated for context detection, matching web-based identifiers and native-identifiers, identifying pages, identifying assets and resolving priority. Third, the DAP content that is to be displayed for an element of a current mobile device screen is implemented in a DAP content display phase 560.

Example Configuration Phase

FIGS. 6, 7, 8, 9, and 10 illustrate different aspects of a larger method. Referring to the flow chart of FIG. 6, in one implementation in block 602, the SDK is started and initialized via an API Key. This key is provided to the client in a secure manner. In block 604, the SDK initializes all the managers where each manager performs certain dedicated tasks. In one implementation, as previously discussed, the managers as illustrated previously in FIG. 4 include a ConfManager, a ContextManager, and a DAPManager.

Figure 7:
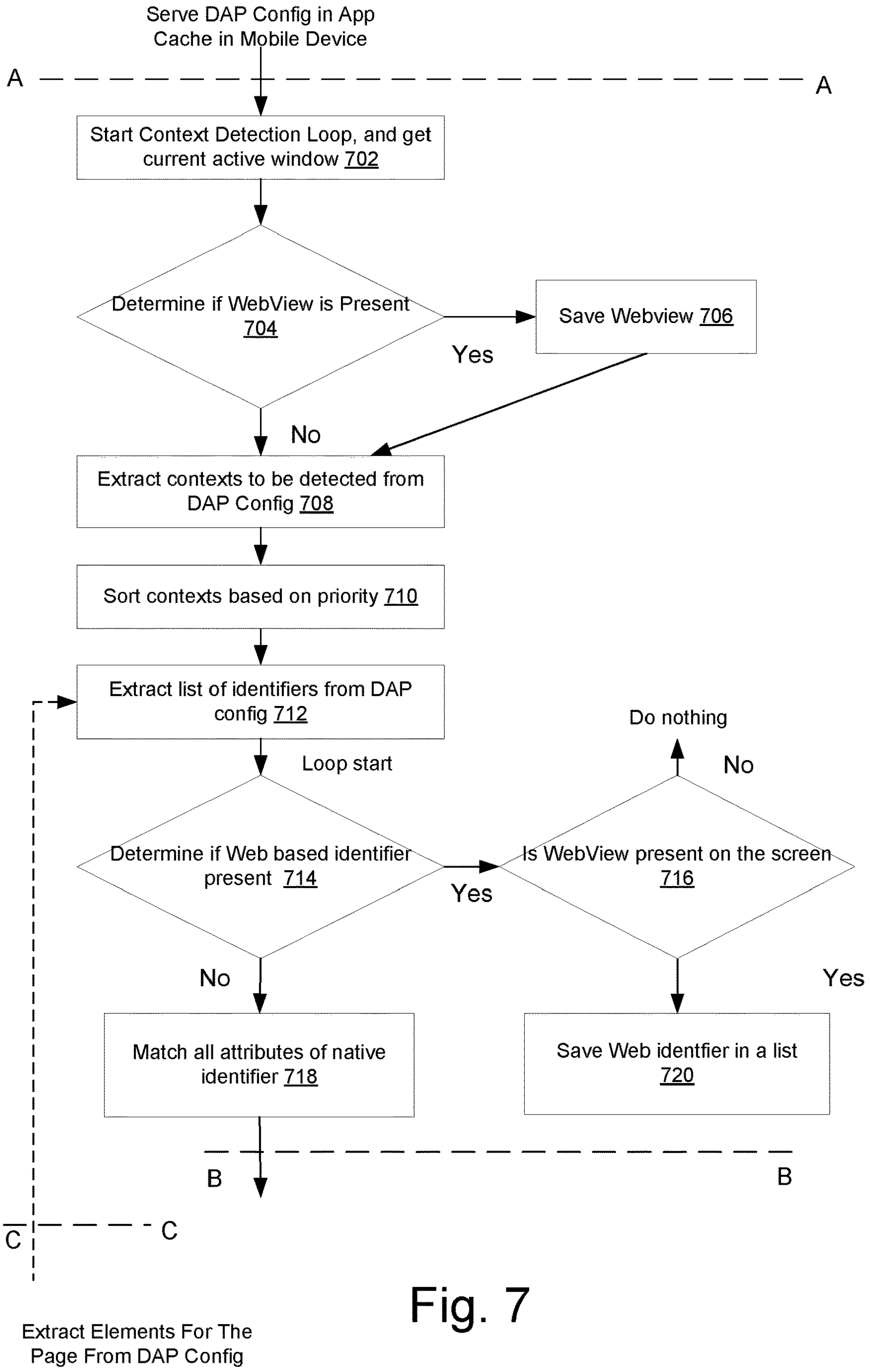
FIG. 7 is a continuation of the flowchart of FIG. 6 in accordance with an implementation.

In decision block 606, the SDK fetches the DAP config from the Mobile Server. If this fails for any reason like a network failure or OS related issues etc., the SDK stops its execution for the next steps. However, if it's successful, the SDK processes the DAP Config in block 608. After processing, the SDK saves the DAP Config in the App Cache in the mobile device in block 610. In block 612, the SDK starts to download all the DAP assets/contents mentioned in the DAP Config. In parallel, the output of block 610 is provided to the core element detection phase (as illustrated in FIG. 7, continuing from line A-A). In block 612, the method starts to download DAP content to a download queue in block 614. (The download queue 614 may receive an input from FIG. 9 as illustrated by the arrow entering from line E-E). In block 616 a particular DAP content may be downloaded and in block 618 the DAP content is saved as an App cache file In one implementation, the SDK loops through all the DAP assets in the DAP Config and pushes the download request into a priority queue for download. In one implementation, the download priority can be changed based on certain factors, as illustrated in FIG. 7.

In one implementation, pre-selected number of download requests are picked up in the process and then the respective DAP contents are downloaded in parallel. In this implementation, the number of parallel downloads depends on the number of cores of the mobile device. For example, if a mobile device has 4 cores, then 8 downloads can happen in parallel. If a mobile device has 6 cores, then 12 parallel downloads can happen.

Once downloaded, DAP content is saved into a file (with a name mentioned the DAP config) in the App Cache in the mobile device.

Core Element Detection Phase

Referring to FIG. 7, in one implementation, the SDK starts a context detection loop in block 702 (executed, for example, once every second) and detects the current active window of the mobile application. This includes detecting the topmost window. The logic to detect the topmost window varies with the platform operating system i.e., Android® and iOS®. The process of determining the topmost window may include filtering out invalid windows. For example, in Android®, the first step is to filter all invalid windows, such as Toast windows (short-lived Android® messages), system-initiated alerts (like phone calls or system error messages), system overlays and copy paste window.

After the filtering process is complete, the correct topmost window is detected. In one implementation, a highest priority window is identified as the correct topmost window. In one implementation by using the following order:

For Android®, the highest priority is given to the Popup Window. If it is present, it should be on top. Next, the Dialog window is given priority. If it is present, it should be on top. If neither of the above windows are present, the Activity window should be on top.

In iOS®, ViewController is always the topmost window.

The SDK then parses the hierarchy of the topmost window and checks the platform for if it's Native or Web or Hybrid.

In block 704, the SDK determines if there is a Web View in the hierarchy of the application. If it's present, the SDK saves the WebView instance in a variable in block 706, to be used later and then proceeds to block 708. If no WebView is present, the SDK directly proceeds to block 708.

In one implementation, the SDK then starts to detect the context of the current screen using the following steps:

In block 708, the SDK extracts all the contexts to be detected from the downloaded DAP Config. For example, this includes extracting starting pages in case of flow experiences, and elements in case of standalone independent experiences.

In block 710, the SDK sorts the above contexts in a list according to a priority defined for them in the DAP Config.

In block 712, the SDK extracts a list of all identifiers for the above sorted contexts. Each context has 1 or more identifiers in the DAP Config. The identifiers contain information about the attributes of individual elements. As an example, for an Android® application, the following attributes (along with their values) are present for an identifier:

'Tag,class'
'Id, class'
'Content_desc,class'
'Id, Tag,class'
'Id, Content_desc,class'
'Tag,Content_desc,class'
'Text,class'

For an iOS® application, the following attributes (along with their values) are present for an identifier:

'Tag,class'
'Acc_id,class'
'Acc_label,class'
'Text,class'
'Acc_id,Acc_label,class'
'Acc_id, Tag, class'
'Acc_label, Tag,class'

Figure 9:
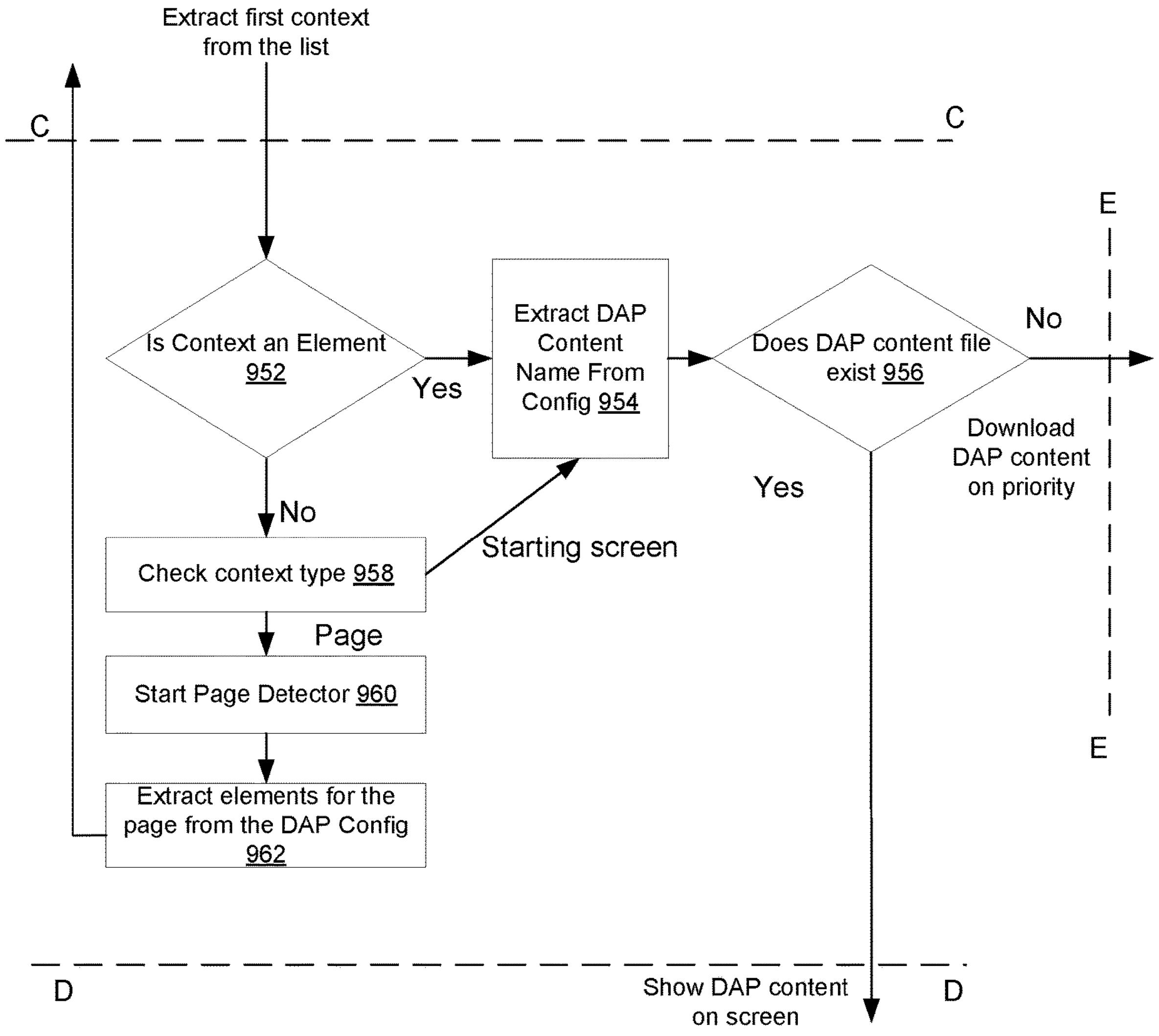
FIG. 9 is a continuation of the flowchart of FIG. 6 in accordance with an implementation.

Note that in one implementation, block 712 may also receive an input from block 962 of FIG. 9, as illustrated by the arrow entering from line C-C.

In block 714, the SDK then begins a loop through all the identifiers in the list, one by one, and tries to check if an identifier is present on the current screen in the mobile application. In one implementation, in block 714, the SDK determines whether the identifier is a web-based identifier. This information is present in the DAP config for that identifier.

If a web-based identifier is identified, the SDK determines in block 716 if a Web View is present on the screen or not. If no, then the SDK does nothing and tries to identify the next identifier from the list. If yes, in block 720, the Web identifier is saved in a list.

However, if a Web identifier is not present, the SDK tries to find a match to a particular native identifier via attribute values in block 718. As an example, consider the following native identifier:

Id=btn_submit, Class=Button
Acc_label=home_view, Class=UiView

Figure 8:
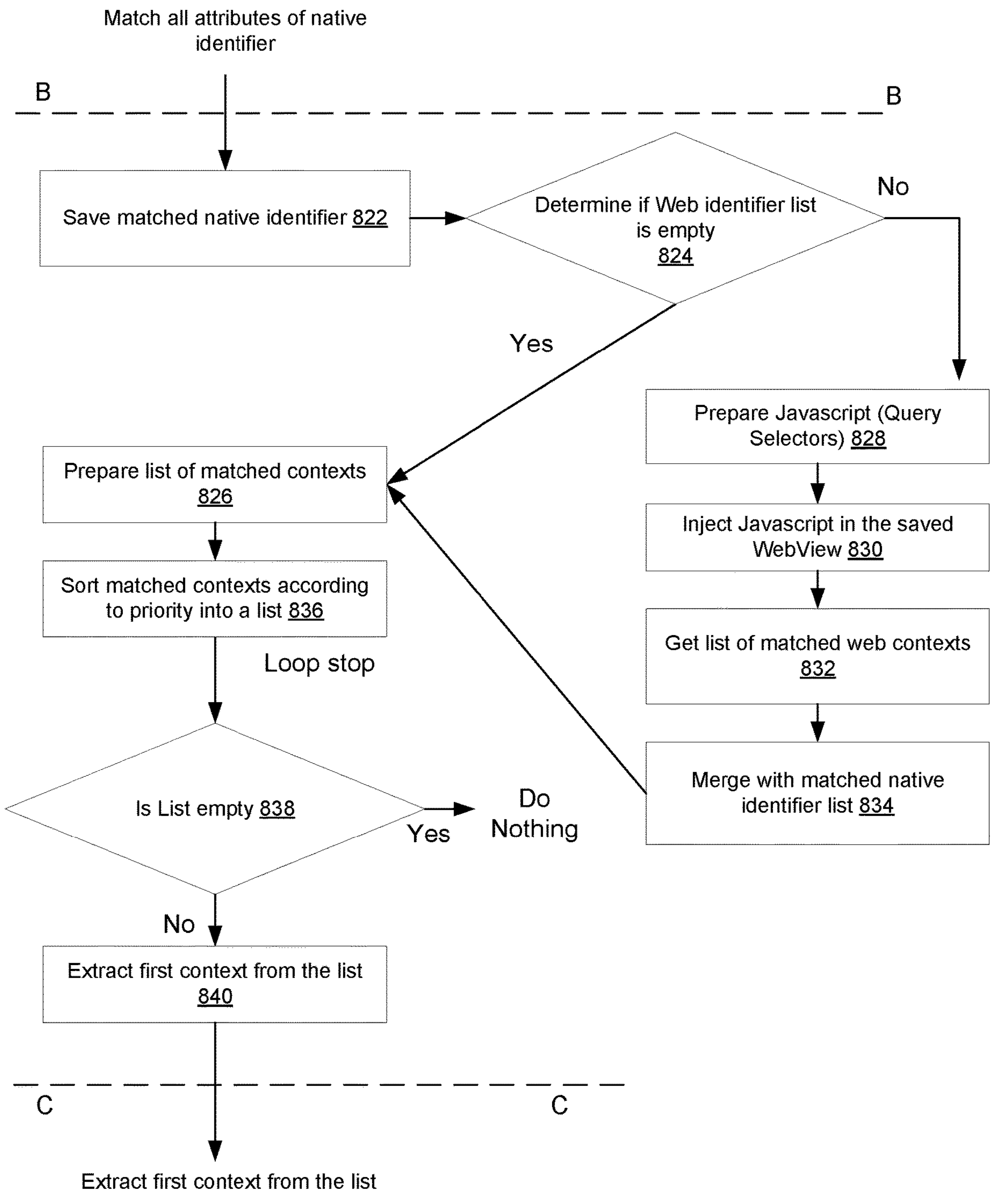
FIG. 8 is a continuation of the flowchart of FIG. 6 in accordance with an implementation.

FIG. 8 continues the flowchart of FIG. 7 from line B-B. If matched, then the SDK saves a list of matched native identifiers in block 822.

As previously discussed, if Web View is present, SDK saves a list of web identifiers in block 822.

In decision block 824, the SDK checks if the web identifier list is empty.

If the web identifier list is empty, then in block 826 a list is prepared of matched contexts containing all the matched native identifiers.

If the web identifier list is not empty, then in block 828, the SDK prepares a Javascript containing QuerySelectors at runtime. In block 830 the Javascript is injected into the webView and gets back the list of matched web contexts in block 832. Note that the SDK doesn't inject multiple javascripts one after the other to match the contexts but injects only one to get back the matched web contexts directly. In block 834 the list of matched web contexts is merged with the matched native identifier list.

All web identifiers (WID) contain certain uniquely identifiable attributes like id, class, alt, img, src, tagName, innerText etc along with their respective values. Multiple WID could be provided to identify an element. All the WIDs are combined with logical AND to determine if the element is present in the given screen. Consider the below example:

Element 1:

WID1 contains tagName="div",class="poppins-medium", innerText="RECENT SEARCH", index=0.

WID2 contains tagName="img",alt="whatfix-logo",index=0.

Element 2:

WID3 contains tagName="a",id="website-link",index=0.

In one implementation if the SDK needs to match element 1 containing WID1, WID2 and element 2 containing WID3, the internal algorithm will detect the presence of element 1 in the screen only if WID1 and WID2 are both matching for an element. Similarly, element2 is present in the screen if WID3 is matching for an element. A WID is identified as present in the screen by querying the DOM using document.querySelectorAll method.

If an element is detected in the screen using the above-described method, it is added to contextDetected array for further processing.

In one implementation, the SDK then prepares a list of matched native contexts in block 826 containing the matched native identifiers. All identifiers in a native context should be present in the matched identifiers list. It then merges all the matched web-based contexts with the native based contexts in block 826 into one list of matched contexts.

The SDK sorts the matched contexts in block 836 according to the priority specified in the DAP config.

In block 838, the SDK determines if the sorted context list is empty. If the sorted context list is empty, then SDK repeats the context detection loop.

If the list is not empty, then in block 840, the SDK extracts the first context from the list. This context is now detected by the SDK and then it goes into showing the DAP output experience for the respective context.

It should be noted that the element detection loop stops if the mobile application goes into the background and restarts when mobile application comes to the foreground Context can be part of an individual element project or a flow project.

FIG. 9 continues FIG. 8 from line B-B. Referring to FIG. 9, a decision is made in block 952 if the context is part of an individual element. If yes, then in block 954 the SDK extracts the respective DAP content file name from the App Cache. In block 956, a determination is made if the DAP content file is present. If so, then the SDK goes into the DAP content display phase to show DAP content on the mobile device screen. If not present, then its download request is prioritized in the download queue (See FIG. 6).

If the context is determined to not be part of the flow in block 952, the SDK in block 958 checks if the context detected is a page level context or starting page of a flow. If it's the starting page of a flow, then the SDK transitions to block 954 and goes into the DAP content display phase. If the context is a page level context, the process moves to start page detector block 960 and then to block 962 where elements for the page are extracted from the DAP config. The SDK iterates through all the element level contexts in the page DAP Config, then tries to detect each one in the contexts list.

Figure 10:
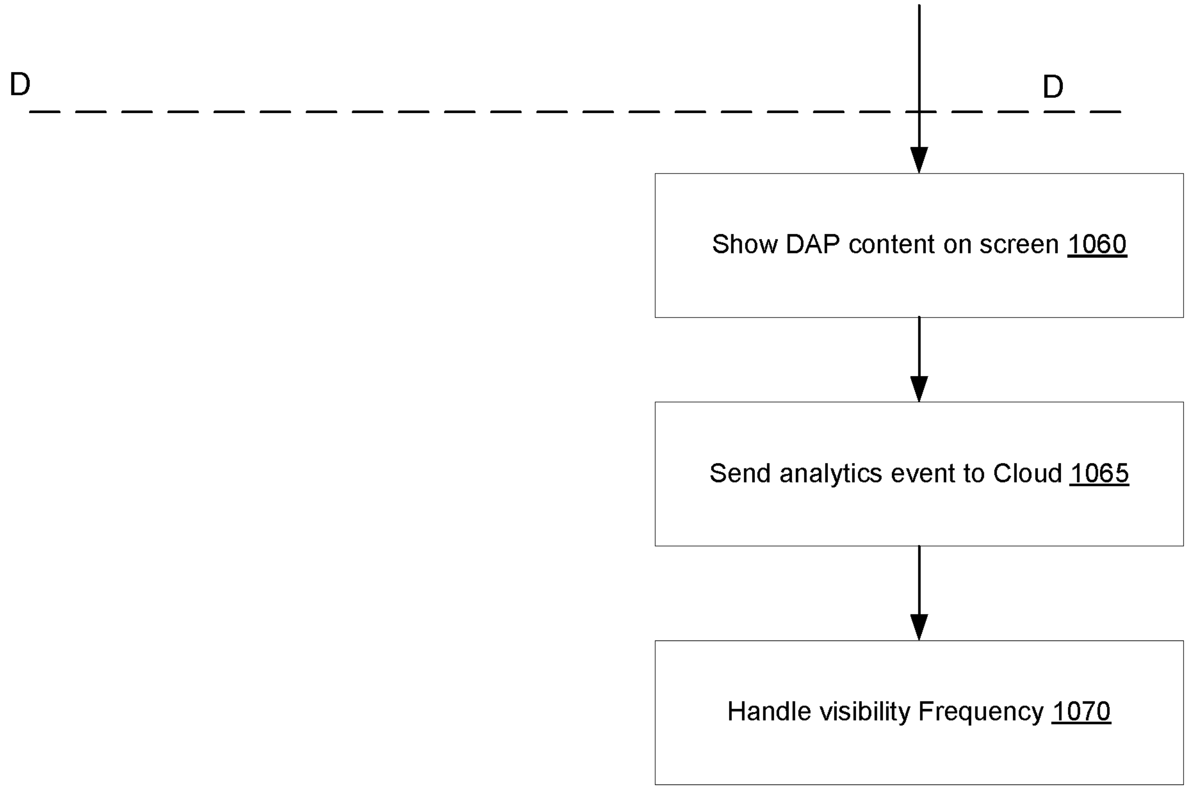
FIG. 10 is a continuation of the flowchart of FIG. 6 in accordance with an implementation.

FIG. 10 continues FIG. 9 from line D-D. In FIG. 10, the DAP content display phase is illustrated. In block 1060, the relevant DAP content is displayed on the screen. In block 1065, analytics events are sent to the cloud. In block 1070, handle visibility frequency for the project includes two aspects. First, if an element shown is from a standalone experience, then the context for that element is removed from the downloaded DAP config for the current session. This is because a standalone cannot be shown more than once per user session. If the app is restarted, this standalone project can be detected again and shown. Second, if the element shown is the starting screen of the flow, the SDK can decide to show the subsequent elements based upon the user interactions like clicking outside the popup or close button etc. Here, the content author can also mention the number of times a start screen of a flow should be shown to a user.

ALTERNATE IMPLEMENTATIONS

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like New, Upload, Sync, and Open in One Drive.

To ease description, some elements of the system and/or the methods are referred to using the labels first, second, third, etc. These labels are intended to help in distinguishing the elements but do not necessarily imply any particular order or ranking unless indicated otherwise.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes, but is not limited to, firmware, resident software, microcode, etc. Furthermore, the technology can take the form of a computer program object accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input or Output devices (including, but not limited to, keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and Modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions and/or formats.

Furthermore, the modules, routines, features, attributes, methodologies, and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment.

What is claimed is:

1. A computer-implemented method of element detection for a digital adoption platform in mobile devices, comprising:

generating, by a first server, a unique connection identifier for a secure communication channel between a dashboard of a Web application displayed on a computer and a Software Development Kit (SDK) implementing the digital adoption platform (DAP) of a mobile application of a mobile computing device;

using the unique connection identifier to establish a secure session between the SDK of the mobile computing device and the dashboard of the Web application, wherein the computer and the mobile computing device are operated by a same DAP content author during a secure communication session;

providing secure access to a DAP configuration database for the same DAP content author to create or edit DAP content for the mobile application of the mobile computing device;

receiving DAP content created by the same DAP content author for a mobile device application;

storing information for a DAP experience of the mobile application as a config file in a mobile server wherein the config file includes DAP content assets and a list of identifiers including at least one of Native identifiers and Web identifiers, wherein the Native identifiers identify a specific mobile device platform; and in response to a request from the SDK running on the mobile computing device, fetching the config file to the SDK to identify current mobile device screen elements and provide information for the DAP experience to be played as a user of the mobile computing device navigates an instantiation of the mobile application running on the mobile computing device.

2. The computer-implemented method of claim 1, wherein the list of identifiers comprises Native identifiers specific to an iOS® platform.

3. The computer-implemented method of claim 1, wherein the list of identifiers comprises Native identifiers specific to an Android® platform.

4. The computer-implemented method of claim 1, wherein the config file includes priority information for at least two different DAP experiences, the method further comprising using priority information to resolve conflicts between two different DAP contents playing on the same screen of the mobile application.

5. The computer-implemented method of claim 1, wherein the config file includes page information for a non-start page.

6. The computer-implemented method of claim 5, wherein the page information includes start page information and page numbers of non-start pages for a DAP flow experience having at least two elements.

7. A computer-implemented method for a digital adoption platform in mobile devices, comprising:

generating, by a first server, a unique connection identifier for a secure communication channel between a dashboard of a Web application displayed on a computer and a Software Development Kit (SDK) implementing the digital adoption platform (DAP) of a mobile application of a mobile computing device;

using the unique connection identifier to establish a secure session between the SDK of the mobile computing device and the dashboard of the Web application, wherein the computer and the mobile computing device are operated by a same DAP content author during a secure communication session;

providing secure access to a DAP configuration database for the same DAP content author to create or edit DAP content for the mobile application of the mobile computing device;

fetching and parsing, for a mobile device application instantiation on the mobile computing device, a DAP config file from a mobile server, the DAP config file including a list of identifiers for at least one screen element, DAP content assets for each screen element of the at least one screen element, and priority information to resolve conflicts between different DAP contents playing on the same screen of the mobile application;

detecting elements of current context of the mobile computing device, including identifying a list of screen elements for a current mobile application screen based on the list of identifiers in the DAP config file;

accessing DAP content assets from the DAP config file for current DAP content; and displaying DAP content for a screen element of the current mobile application screen.

8. The computer-implemented method of claim 7, wherein the fetching is part of a configuration phase to fetch, process, and save DAP config data on the mobile computing device, including downloading DAP assets.

9. The computer-implemented method of claim 8, wherein detecting elements of current context is part of a core element detection phase that includes matching web-based identifiers and native-identifiers, identifying pages, identifying assets and priority.

10. A computer-implemented method for a digital adoption platform in mobile devices, comprising:

generating, by a first server, a unique connection identifier for a secure communication channel between a dashboard of a Web application displayed on a computer and Software Development Kit (SDK) implementing the digital adoption platform (DAP) of a mobile application of a mobile computing device;

using the unique connection identifier to establish a secure session between the SDK of the mobile computing device and the dashboard of the Web application, wherein the computer and the mobile computing device are operated by a same DAP content author during a secure communication session;

providing secure access to a DAP configuration database for the same DAP content author to create or edit DAP content for the mobile application of the mobile computing device;

in response to a request from the SDK running on the mobile computing device, downloading a copy of a config file from a mobile server, the config file providing a list of screen elements, associated element identifiers, and associated content assets to provide information for a DAP experience to be played as a user of the mobile computing device navigates an instantiation of the mobile application running on the mobile computing device;

detecting, by the SDK, a context present in a current mobile device screen of the mobile computing device, wherein the context is a representation of the list of identifiers from the config file present in the current mobile device screen; and playing DAP content for an identified screen element in the current mobile device screen.

11. The computer-implemented method of claim 10, wherein the config file comprises a plurality of identifiers, the plurality of identifiers including at least one of native identifiers and web identifiers, each element of the config file being associated with at least one identifier and corresponding DAP content assets.

12. The computer-implemented method of claim 11 wherein the Native identifiers include identifiers to identify DAP content assets specific to a specific mobile device platform.

13. The computer-implemented method of claim 12, wherein the Native identifiers are configured to identify DAP content assets corresponding to an iOS Platform®.

14. The computer-implemented method of claim 12, wherein the Native identifiers are configured to identify DAP content assets corresponding to a native Android® platform.

15. The computer-implemented method of claim 10, wherein the config file includes priority information to resolve conflicts between two DAP contents playing on the same screen of the mobile application.

16. The computer-implemented method of claim 15, wherein the config file includes page information.

17. The computer-implemented method of claim 16, wherein the page information includes start page information and page numbers of non-start pages for a DAP flow experience having at least two elements.

18. The method of claim 10, wherein the SDK is configured to download a copy of the config file, detect a currently active window of the mobile application, and extract corresponding identifiers and content therefrom.

19. The computer-implemented method of claim 10, wherein the config file includes priority information to resolve conflicts between two DAP contents playing on the same screen of the mobile application.

* * * * *